(12) United States Patent
Loce et al.

(10) Patent No.: US 7,667,727 B2
(45) Date of Patent: Feb. 23, 2010

(54) MULTIPLE-BEAM RASTER OUTPUT SCANNER WITH A COMPENSATING FILTER

(75) Inventors: Robert P. Loce, Webster, NY (US); Beilei Xu, Penfield, NY (US); Patrick Y. Maeda, Mountain View, CA (US)

(73) Assignees: Palo Alto Research Center Incorporated, Palo Alto, CA (US); Xerox Corporation, Norwalk, CT (US)

( * ) Notice: Subject to any disclaimer, the term of this patent is extended or adjusted under 35 U.S.C. 154(b) by 0 days.

(21) Appl. No.: 11/961,486

(22) Filed: Dec. 20, 2007

(65) Prior Publication Data

US 2009/0160928 A1 Jun. 25, 2009

(51) Int. Cl.
*B41J 15/14* (2006.01)
*B41J 27/00* (2006.01)

(52) U.S. Cl. ...................... 347/241; 347/256
(58) Field of Classification Search .................. 347/259, 347/230, 241, 244, 256, 258; 372/98, 102
See application file for complete search history.

(56) References Cited

U.S. PATENT DOCUMENTS

| 4,305,650 | A | | 12/1981 | Knox |
| 4,884,083 | A | * | 11/1989 | Loce et al. ................... 347/259 |
| 5,272,715 | A | * | 12/1993 | Guerin ......................... 372/98 |
| 6,967,986 | B2 | * | 11/2005 | Kowarz et al. .............. 372/102 |

* cited by examiner

*Primary Examiner*—Hai C Pham
(74) *Attorney, Agent, or Firm*—Fay Sharpe LLP (57) ABSTRACT

A printing system includes a multiple-beam generator array configured to generate multiple beams. A collimator lens is positioned to receive the multiple beams, and an aperture stop is located where the multiple beams are spatially coincident with each other. A scanning optical system is positioned to receive the beams from the aperture stop, and a recording medium receives the beams from the scanning optical system. A filter is located where the multiple beams are spatially coincident with each other, whereby each of the multiple beams may be filtered by the supplied filter.

20 Claims, 6 Drawing Sheets

MULTIPLE-BEAM RASTER OUTPUT SCANNER WITH A COMPENSATING FILTER

BACKGROUND

The present application is directed to an electronic copier or printer of the type which uses a multi-beam raster output scanner (ROS) to form images on a photoreceptor surface. More particularly, the application is directed to spatial filters located in the optical path of the ROS to compensate for imperfections and/or errors in the operation and/or manufacture of the ROS system.

For example, solid area non-uniformity, line growth, and banding, as well as other undesirable image defects may occur when ROS technology is employed to generate an image. These image quality defects are objectionable and lead to costly ROS designs. To address these issues a low cost banding reduction solution via optical filtering was introduced in U.S. Pat. No. 4,884,083, entitled, "Printer Compensated for Vibration-Generated Scan Line Errors," by Loce et al., issued Nov. 28, 1989, incorporated herein in its entirety.

Loce et al. disclose a printing system employing a raster output scanning (ROS) device which incorporates compensation for the effects of motion of the medium upon which an image is being printed. More particularly an amplitude transmittance spatial filter is positioned either in the "slow scan" exit pupil of the optics of the system or in the first Fourier transform plane of the scanning optical system.

Many modern laser scanners use 1-D and 2-D arrays of beam generators. It is therefore desirable to have a low cost optical filtering method and apparatus for image error reduction that works with and addresses imaging issues for multiple-beam scanning systems.

BRIEF DESCRIPTION

A printing system includes a multiple-beam generator array configured to generate multiple beams. A collimator lens is positioned to receive the multiple beams, and an aperture stop is located where the multiple beams are spatially coincident with each other. A scanning optical system is positioned to receive the beams from the aperture stop, and a recording medium receives the beams from the scanning optical system. A filter is located where the multiple beams are spatially coincident with each other, whereby each of the multiple beams may be filtered by the supplied filter.

DETAILED DESCRIPTION

Figure 1A:
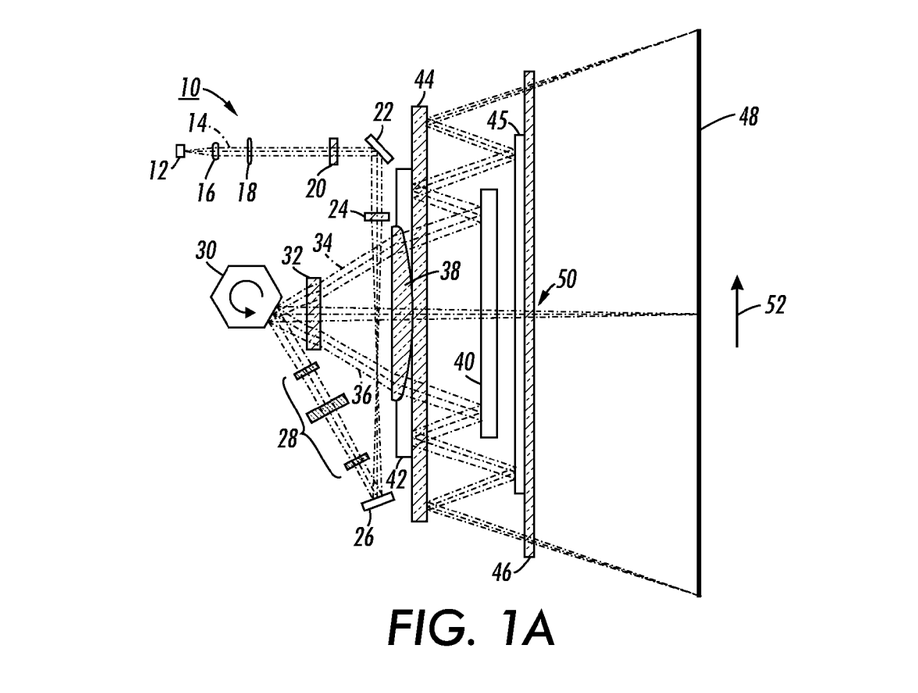
FIG. 1A is a top view of a multiple-beam laser scanner system to which the concepts of the present application are applied.

FIG. 1 represents a top view of a multiple-beam laser scanner system 10 according to the concepts of the present application. Initially, an independently addressable laser array 12, which includes a plurality of beam-generating elements, emits beams 14, defined as a group, to pass through a collimator lens 16, an aperture stop 18, and a first cylinder lens 20. Beams 14 impinge on a first fold mirror 22, causing beams 14 to move through a second cylinder lens 24 to a second fold mirror 26. Next, beams 14 passes through cylinder lens group 28, consisting of three separate cylinder lenses, and onto a facet of rotating polygon mirror 30. Rotation of the polygon mirror causes the beams 14 to be scanned through a range of angles and positions, including side scan positions 34 and 36 and center position 50. The scanned beams 14 pass through a first scan lens 32 and a second scan lens 38 and then bounce between cylinder mirrors 40, 42, 44 and fold mirror 45, and through a portion of output window 46, to a recording medium 48, which in one embodiment may be a photoreceptor or xerographic drum.

The beams 14 are scanned in scan direction 52, which is the "fast scan" direction. Beams 14 are reflected to impinge on and illuminate a plurality of contiguous facets of polygon mirror 30. The rotational axis of polygon mirror 30 is orthogonal to the plane in which light beams 14 travel. With rotation of the polygon mirror 30, beams are reflected from illuminated facets and turned through a scan angle for flying spot scanning. Alternatively, flying spot scanning could be provided by any other suitable device, such as a holographic scanner incorporating linear diffraction gratings. Beams 14 are modulated in conformance with information contained in a video signal input. The output intensity profile of each laser beam in the array is Gaussian or near-Gaussian. The beams 14 generate more than a single imaging spot on the recording medium, where the spots are generated in conformance with signal image information.

The details of FIG. 1A are intended to illustrate one embodiment of a multiple-beam laser scanner system which incorporates concepts of the present application. However, it is to be understood such concepts may also be used in multiple-beam scanner systems of other designs. Further, while the present concepts maybe applied to systems with as few as two beams, presently multiple-beam systems have been developed which include 31 or 32 beams, and the present concepts are applicable to these systems.

Figure 1B:
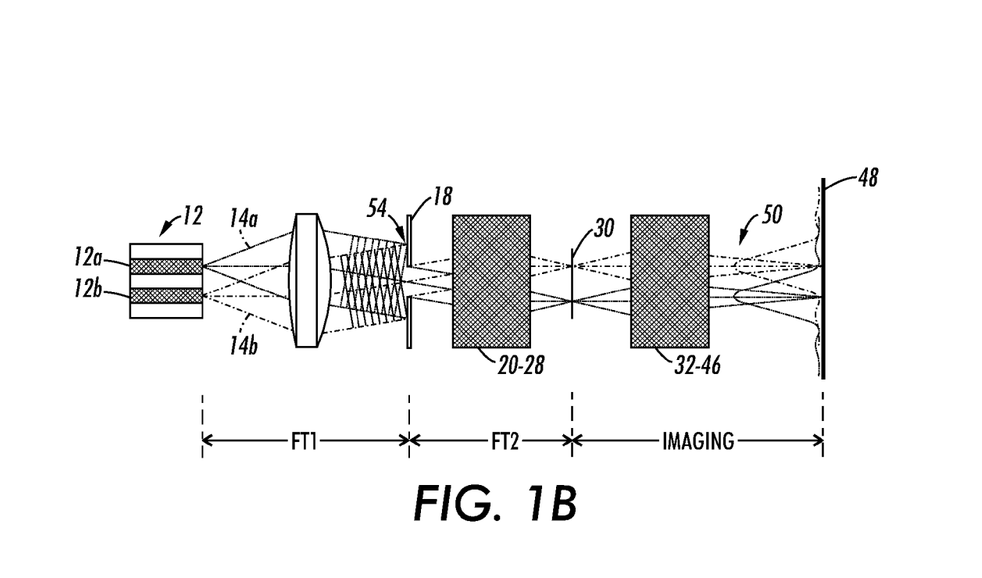
FIG. 1B is a schematic view of the multiple-beam laser scanner system of FIG. 1A with a compensating filter positioned in the first Fourier plane of a scanning optical system.

FIG. 1B sets forth a simplified schematic of the multiple-beam scanner system according to FIG. 1A. FIG. 1B identifies a first (or object) Fourier Transforming operation FT1 performed by the collimator optics to generate a system Fourier plane at the aperture stop 18, a second (image) Fourier Transforming operation FT2 performed by the remainder of the optics, and a compensating filter 54 positioned in the system Fourier plane and configured according to the concepts of the present application. In the present exemplary embodiment the system Fourier Transform plane is the Fourier plane of the collimator lens 16.

FIG. 1B also details the plurality of beam generators which are part of beam generator array 12. In this embodiment for simplicity, two beam generators 12a, 12b are depicted. These beam generators emit corresponding beams 14a, 14b to collimator lens 16, which focuses the beams as they pass through system aperture stop 18. In this figure compensating filter 54 is located immediately before aperture stop 18. Thus beams which pass through aperture stop 18 have been filtered in a manner in accordance with the present application. Filter 54 is thus in one embodiment an optical filter placed in the coincident plane, in a multiple-beam scanning system with coincident Fourier planes. The filter may be an amplitude filter, phase filter or other appropriate filter.

The filtered beams then enter the remainder of the optical scanning system 22-46 which is depicted, for simplicity, as two blocks. The first block may be considered to consist of a pre-polygon optical system comprised of components 20-28 of FIG. 1A, and a second block representing a post-polygon optical system comprised of components 32-46.

In the scanning optical system 20-46 of FIG. 1B, there is an intermediate image in the slow scan direction that is formed by the pre-polygon optical system 20-28 onto a facet of the polygon mirror 30. The intermediate image is formed, and usually magnified by a factor <1, by the post-polygon optical system 32-46 onto recording medium 48 in the form of center position beams 50. The post-polygon optical system 32-46 does not filter the intermediate image and only scales it spatially. A Fourier transform operation occurs from aperture plane to polygon facet plane (e.g., FT2). Conventional imaging occurs from the polygon facet plane to photoreceptor plane where a spatially scaled version of the Fourier transform is formed (e.g., FT2 scaled spatially by the imaging magnification of post-polygon optical system).

An issue which arises when considering filtering beams of a multiple-beam scanning system is dealing with the paths of each individual beam. In particular, to ensure a predictable filtering operation each beam needs to be subject to the filter. To accomplish this operation the multiple-beam generator array 12 is placed in the front focal plane 16a of collimator lens 16. This configuration provides a Fourier transform relationship between beam generator array 12 and back focal plane 16b of collimator lens 16. By this arrangement all of the beams are collimated at different exit angles, but overlap at the back focal plane 16b as shown in FIG. 1B.

Aperture stop 18 is therefore placed at the back focal plane 16b which allows it to simultaneously truncate all of the beams equally at that location. Additionally, in the scanning optical system of FIG. 1B, there is a Fourier transform relationship between aperture stop 18 and the plane of photoreceptor 48. These factors make the back focal plane 16b/aperture stop 18 position a desirable location for compensating filter 54 as it is able to operate on all beams equally and simultaneously, and the effects of filter 54 at the photoreceptor plane can be accurately predicted by Fourier analysis.

Therefore the devices to which the present concepts apply are multiple-beam scanning systems where a pupil plane for each generated beam is co-planar and in register with each other. When they are all in the same plane and in register, then when compensating filter 54 is placed in the appropriate pupil plane (i.e., the back focal plane of the collimator lens 16b/aperture stop 18 position), each one of the beams will be filtered by the same filter. So in the described system all of the beams are spatially coincident after the first Fourier transform FT1 at the system Fourier plane so every beam is appropriately filtered or not filtered.

Thus, in the system of FIGS. 1A and 1B, beams completely overlap spatially at the aperture and partially overlap at the polygon facet and recording medium (e.g., photoreceptor). Interference effects can occur at aperture plane and at the photoreceptor. Finally, the described optical configuration yields Fourier transform relationships between: (i) laser and aperture planes; (ii) aperture and polygon facet planes; and (iii) aperture and photoreceptor planes effectively scaled by imaging magnification.

In addition to the issue of filtering multiple beams in multiple-beam scanner systems at an appropriate location, other issues exist which would not be encountered when using single-beam systems. Particularly, certain imaging errors occur in a multiple-beam system that cannot occur in single-beam systems or 1D systems. Two such errors are magnification errors and rotation errors (as this only occurs for 2D array systems.

Figure 2:
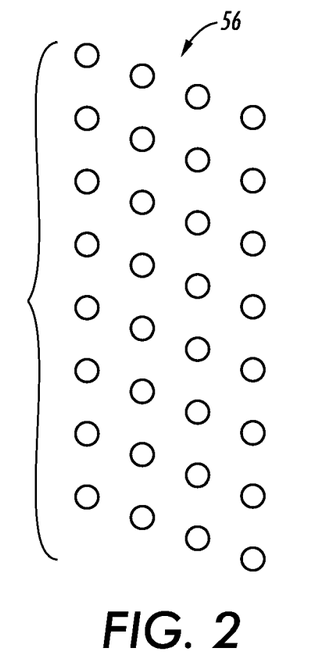
FIG. 2 is a beam generator array which may be used in the system of FIGS. 1A and 1B.

For example, as shown in FIG. 2, a multiple-beam array 56 may be a two-dimensional array having a parallelogram pattern of individual beam generators. This type of design allows for magnification errors in a processing operation having a first step where the entire imaging spot array is swept across a page. Then according to a common operation, the array is moved down the recording medium and the array is swept for the next block of image generation. If the magnification of the beam generators is inappropriate, an overlap will exist between what was imaged in the first sweep and what was imaged in the second sweep. Then when the image is printed, the location corresponding to the overlapped area will be darker than intended. This type error cannot occur in single-beam systems.

To address this issue, a class of filters possessing an autocorrelation that achieves notching out a spatial frequency can be used. For example, compensating filter 54 is designed as a spatial frequency filter used to notch out a particular problematic frequency or problematic frequencies while minimizing the degradation of other frequencies of interest. Compensating filter 54 is designed for a particular optical system by using the principle of optical physics which identifies that the MTF (Modulation Transfer Function) of an optical system is the autocorrelation of the exit pupil (Fourier plane) scaled to spatial frequency coordinates. In the exemplary optical design of FIGS. 1A and 1B, the exit pupil is the image of the aperture stop, and filter design becomes a problem of determining a transmission (if on a transparent plate) filter with a particular autocorrelation that is placed in the optical path near or on the aperture stop. Alternatively, filter design could be a problem of determining a reflectance filter with a particular autocorrelation if the exit pupil was located at or near a mirror, such as the polygon facet mirror.

This class of spatial filters can be described as a set of bars that are spaced by the scaled spatial frequency to be notched and are less than or equal to the scaled spatial frequency in width. The scaling factor is the product of the collimator lens focal length F and the wavelength of light $\lambda$. For instance, if it is desired to notch out 3.04 cy/mm in the recording medium (image) plane, several semi- or fully opaque bars (3, 5, 7, ...) can be placed in the system Fourier plane, where the bars are spaced by (3.04 cy/mm)×(F$\lambda$) and are $\leq$(3.04 cy/mm)×(F$\lambda$) in width. Increasing the number of bars deepens the notch filter, but also results in loss of modulation at other spatial frequencies.

Figure 3:
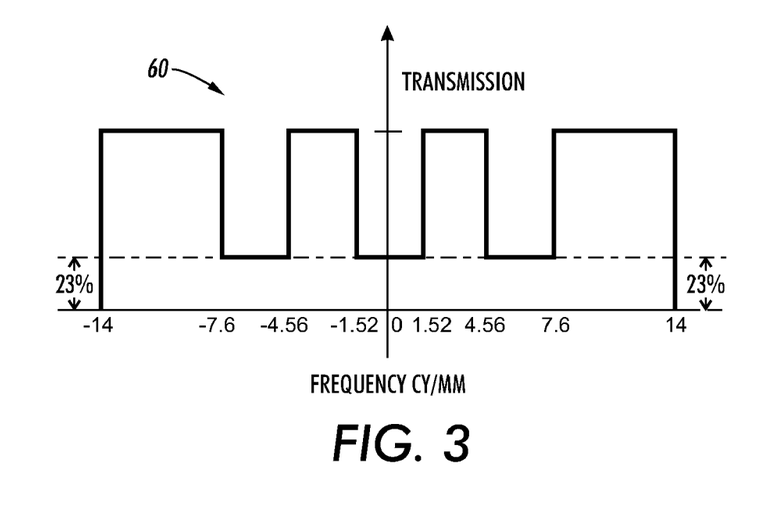
FIG. 3 is a filter transmittance profile according to the present application.

FIG. 3 shows transmission 60 of an exemplary filter, such as filter 54 of FIG. 1B, that could be used to suppress 3.04 cy/mm in the written image. This frequency is chosen for this particular embodiment as it has the potential to occur in a particular VCSEL ROS architecture (i.e., interlace 2, 31 beams, non-overwriting, 2400 rasters/inch) for errors in magnification of the optical system. The example of FIG. 3 details the bars having a 23% amplitude transmittance, which was arrived at via a Design of Experiments (DOE) process that optimized the notching while minimizing a particular image degradation.

Figure 4:
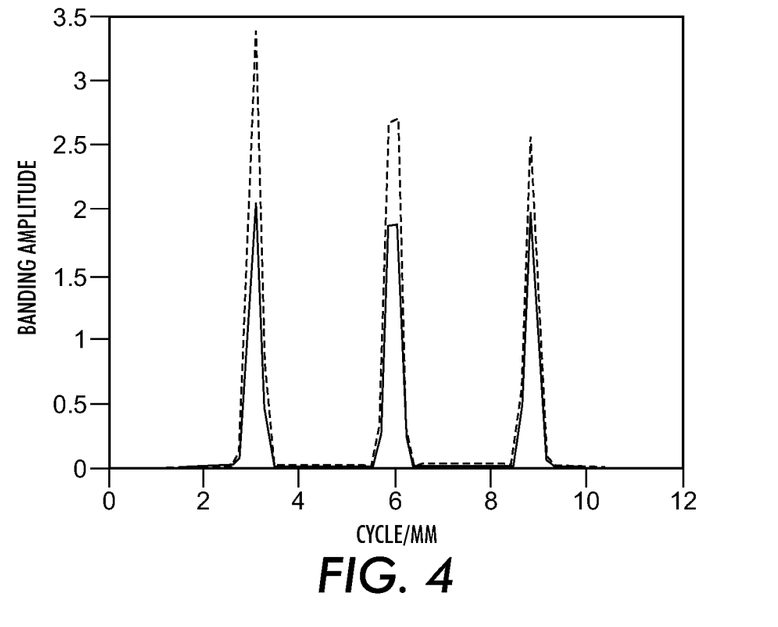
FIG. 4 is a frequency spectrum of uniform image written with magnification error.

FIG. 4 shows the Fourier spectrum of a written uniform image with a magnification error for the particular VCSEL ROS architecture mentioned above (i.e., interlace 2, 31 beams, non-overwriting). Waveform 62 represents the error in the frequency spectrum of a written image due to magnification error of the system without a filter, and waveform 64 represents the error in the frequency spectrum of a written image due to magnification error of the system with a notch-type compensating filter, such as a filter having transmission characteristics 60. Ideally, the uniform image should have a frequency spectrum that is zero everywhere except at zero frequency. Magnification error produces banding components at 3.04 cy/mm and its harmonics. The notch compensating filter 54 with transmission profile 60 reduces the amplitude of the banding at 3.04, 6.08, and 9.12 cy/mm by approximately 39%, 30% and 24% respectively.

Figure 5:
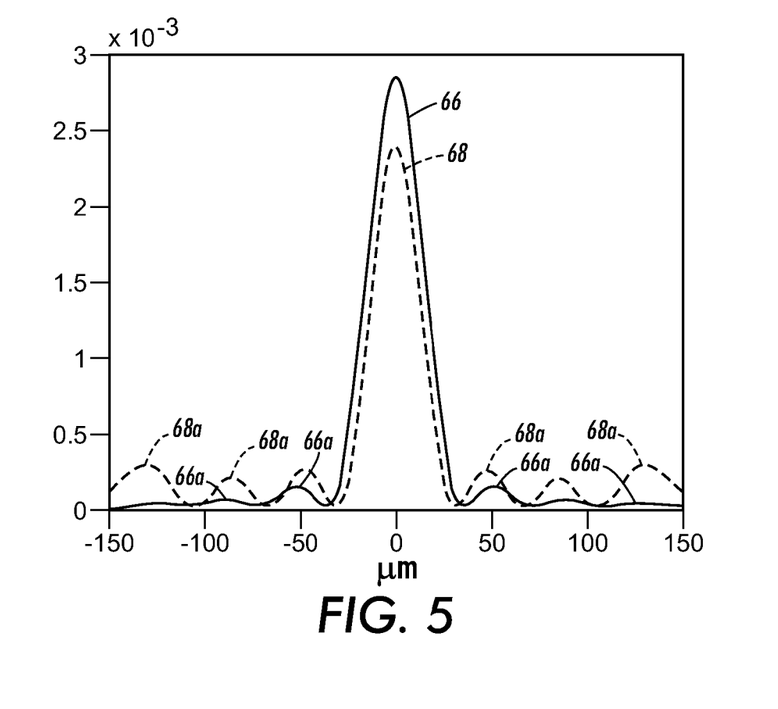
FIG. 5 shows spot function profiles for a system with and without a filter such as in FIG. 3.
Figure 6:
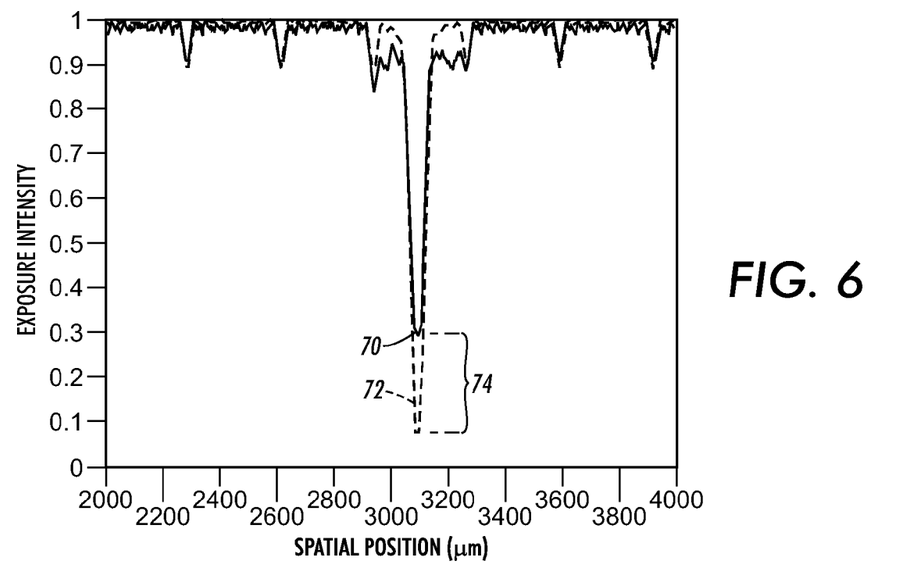
FIG. 6 shows exposure profiles of narrow inverse lines (~64 micron width) with and without a compensating filter.

The notch filter affects the shape of the optical spot written on the photoreceptor. FIG. 5 shows a spot waveform 66 formed in a system without a filter, and a spot waveform 68 formed in a system with the notch type compensating filter. Also shown is ringing tails 66a and 68a for each of spot waveforms 66 and 68, where energy in the tails is greater for spot waveform 68. This change in spot shape can cause a decrease in contrast for narrow white (unwritten) lines. The design of the notch filter used to address the magnification error (i.e., which has the characteristics shown in FIG. 3) attempts to balance out this negative effect with the beneficial reduction in banding. This balance is achieved by attempting to minimize the loss of contrast in a narrow reverse line (i.e., white line or unexposed line on a dark or exposed background). In this particular design, a narrow (64 microns) white line is used as a sensitive feature that is to be preserved. FIG. 6 shows the exposure profile for this line with the filter as waveform 70 and without the filter as waveform 72. In the system having the filter there is a loss in contrast of 25%. For some laser printing scenarios, this can be a reasonable compromise to suppress the banding.

A simple filter which minimizes banding frequency $f_0$ can be expressed as:

$$T(x) = 1 - a \sum_{n=-M}^{n=+M} rect\left[\frac{x - 2nF\lambda f_0}{F\lambda f_0}\right] \quad (1)$$

where a is the desired absorptance of the filter bars (e.g., a=1 means fully opaque, a=0 means fully transmissive relative to the transmittance of any medium on the Fourier plane, M defines the number of bars to use in the target, where the number of bars=1+2M, F is the focal length of the collimator lens, and $\lambda$ is the wavelength of light emitted by the laser diode.

Thus, a filter according to one embodiment of the disclosed concepts is designed with absorbing bars spaced on centers that equate to 2× the frequency to be suppressed, with a first bar centered in a position that equates to zero frequency.

A particular filter which suppresses banding at frequency $f_m$ due to a magnification error is expressed as:

$$T(x) = 1 - arect\left[\frac{x}{F\lambda f_m}\right] - arect\left[\frac{x - F\lambda f_m}{F\lambda f_m}\right] - arect\left[\frac{x + F\lambda f_m}{F\lambda f_m}\right] \quad (2)$$

Equation (2) is derived from Eq. (1) by setting $f_0=f_m$ and M=1. The exemplary filter shown in FIG. 3 is of the form of Eq. (2), where a=0.77, M=1, F=23.3 mm, $\lambda$=780 nm, and $f_m$=3.04 cy/mm.

As mentioned there are at least two specific errors which are unique to multiple-beam systems. These include the above described magnification error, and the too be described rotation error.

Diodes within a two-dimensional array such as array 56 of FIG. 2, where each row of beam generators is angled, tend to be very accurately positioned. However, rotation errors can nevertheless occur due to errors in the rotation of the entire array, causing beams either to overlap or to form a gap. The error frequency will be the same for plus (e.g., overlap) or minus (e.g., gap) angular rotation errors.

Figure 7:
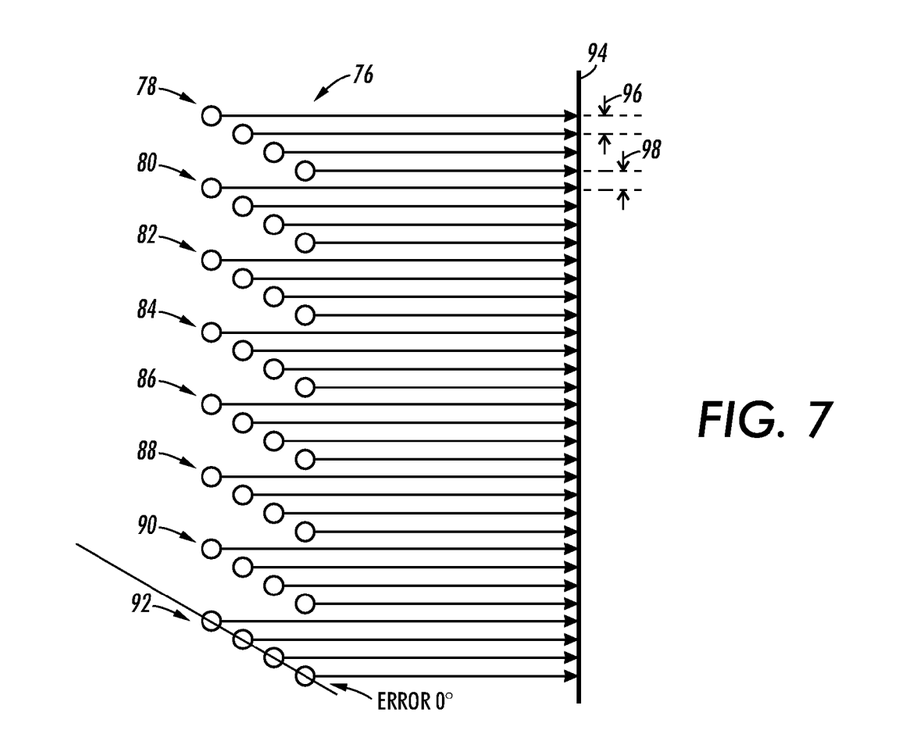
FIG. 7 depicts a beam generator array no having rotation error.

Turning to particular examples of the above, diode array 76 of FIG. 7 includes eight rows 78-92 of four angled diodes. Beam output from diode rows 78-92 results in substantially equally spaced beams impinging on surface 94. The equal spacing exists for both beams generated within a row 96 and beams formed by diodes in adjacent rows 98. In this example there is no rotation error, so the beams do not overlap or form an undesirable gap.

Figure 8:
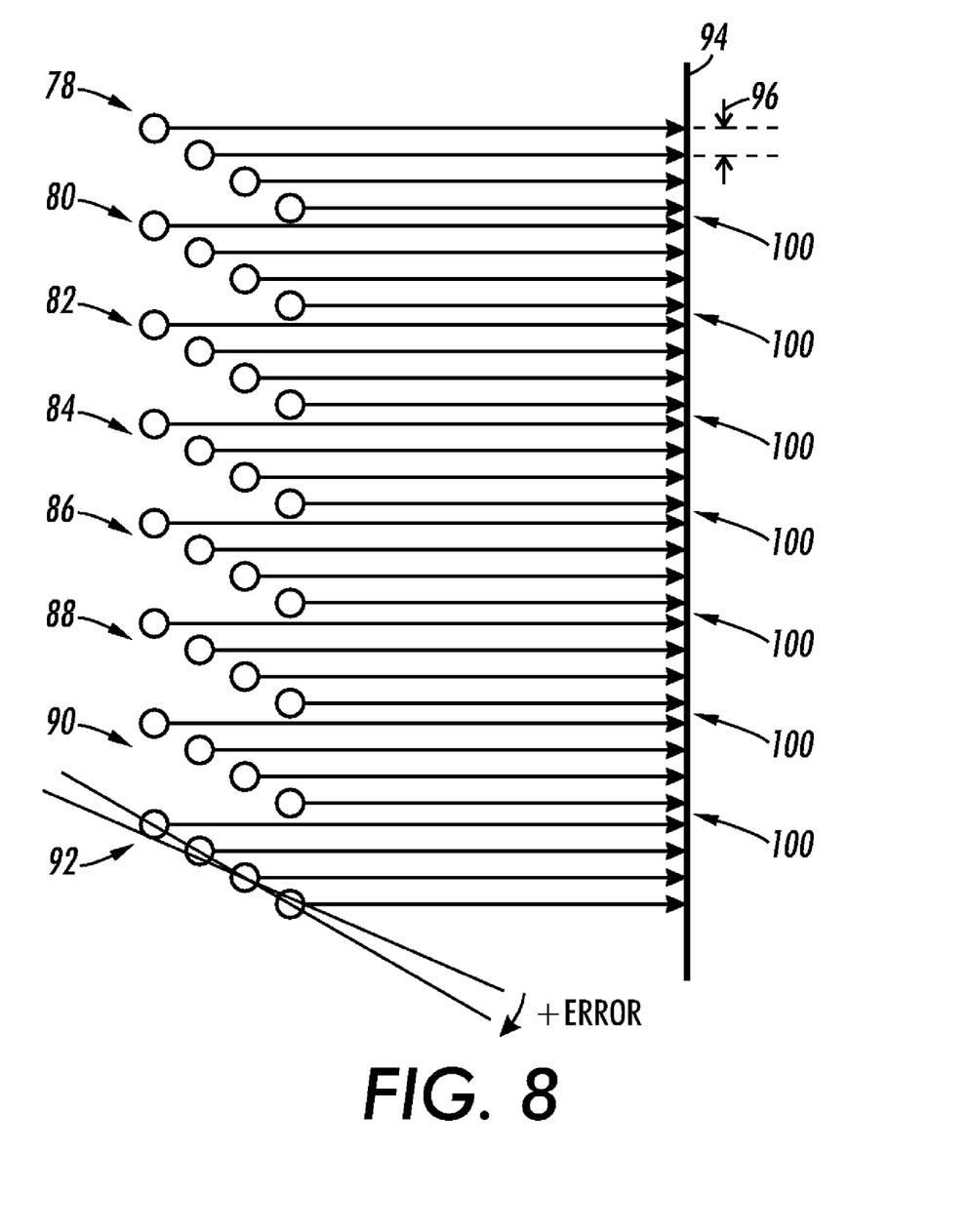
FIG. 8 depicts a beam generator having a clockwise rotation error.

Turning to FIG. 8, array 76 is shown with a clockwise, plus or positive angular rotation error. In this position, as in FIG. 7, beams generated by diodes within a row maintain the same distance from each other (e.g., 96). However, due to the rotation error, a last beam from a prior row and a first beam from a succeeding row are positioned undesirably close to each other, causing beam overlap 100 at surface 94. More specifically, in FIG. 8, beams from the last diode in row 78 and the first diode in row 80 overlap (similar overlapping occurs for beams generated by the last diode of a row and the first diode of the succeeding row, for the remaining rows of the array). Again, such an overlap occurs due to an error in the rotation of the entire array.

Figure 9:
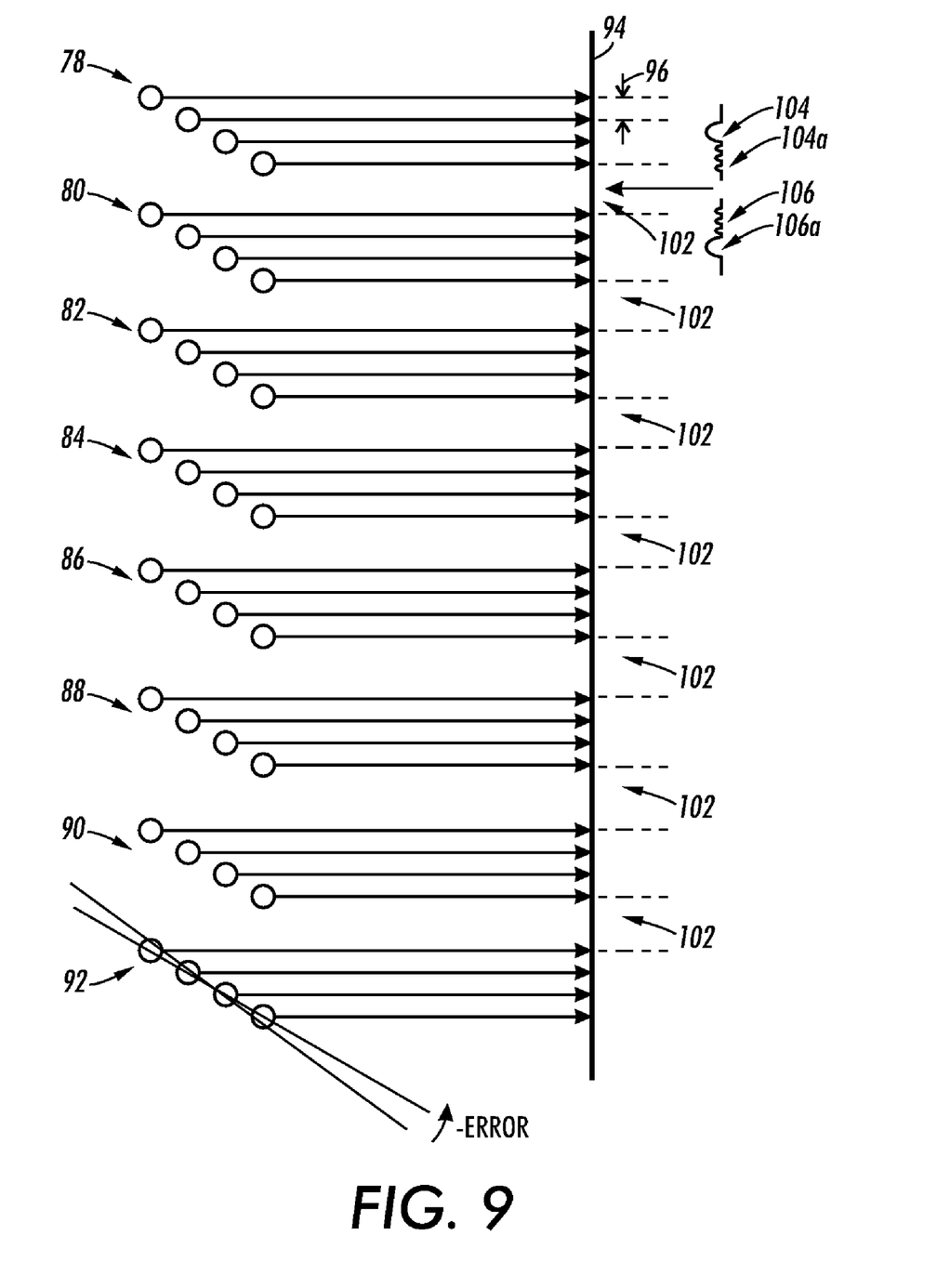
FIG. 9 depicts a beam generator having a counter-clockwise rotation error.

As mentioned above, and illustrated in FIG. 9, counter-clockwise, minus or negative rotation errors may cause an undesirably wide beam gap. As with the preceding figures, spacing of beams within the same row remain evenly spaced 96. However, when a minus or negative angular rotation error occurs, a beam gap 102 between the beam from a last diode in a row and the beam from the first diode in a next row will occur.

In accordance with the present application, a filter may be configured to minimize or eliminate the undesirable interference (overlap) between the beams from diodes of rows 78 and 80.

The transmittance of a particular filter to suppress banding at a frequency $f_r$ due to a rotation-induced overlap error can be expressed as:

$$T(x) = 1 - arect\left[\frac{x}{F\lambda f_r}\right] - arect\left[\frac{x - F\lambda f_r}{F\lambda f_r}\right] - arect\left[\frac{x + F\lambda f_r}{F\lambda f_r}\right] \quad (3)$$

On the other hand, if the error results in what is considered too large a gap, a filter is designed according to the above to alter the frequency to match the needed frequency output. Then notches are inserted in the filter so the frequency signal outputs 104 and 106 will have lobes or bumps 104a, 106a induced in the spread frequency to fill the gap.

As described, the present application is directed to a multiple-beam ROS imager architecture that employs a frequency domain filter in the optical Fourier plane to compensate for banding and other image imperfections due to sources such as array rotation error, magnification error, and other ROS or imaging system errors. Two particular aspects of the present application include: (1) designing the optical system such that the slow-scan Fourier planes for all the beams are coincident; (2) an optical banding reduction filter is placed in this coincident plane. Simulations have shown that a particular design under test for magnification error reduces banding amplitude by roughly 39%, with the drawback of losing 25% contrast of a very narrow line (64 microns). The concepts apply to 1-D or 2-D arrays of beam generators. Also, in addition to reducing or eliminating aforementioned banding errors, the filters will also address stitching defects, solid area non-uniformity line growth and polygon once around and its harmonics, among others (as once around and stitching defects are also banding errors.

Thus, during filtering in the spatial domain, every beam that is on, has bumps added that end up notching out problem frequencies. In the frequency domain, the bumps are defined as divots where the frequency is suppressed. So in the coincident plane, where all of the multiple beams are coincident, there is a filter that produces reduced MTF or reduced frequency response at particular target frequencies.

Targets that have been developed under this application have been primarily periodic. However, this is not necessary. For example, some of the bars of the filter may be higher or lower than the others, and instead of squared edges, the edges may be rounded. It is to be appreciated these are only examples, and still further distinct formations are possible.

It will be appreciated that various ones of the above-disclosed and other features and functions, or alternatives thereof, may be desirably combined into other different systems or applications. Also various presently unforeseen or unanticipated alternatives, modifications, variations or improvements therein may be subsequently made by those skilled in the art which are also intended to be encompassed by the following claims.

The invention claimed is:

1. A printing system comprising:
    a multiple-beam generator array configured to generate multiple beams;
    a collimator lens positioned to receive the multiple beams;
    an aperture stop positioned at a location where the multiple beams are each coincident with each other;
    a scanning optical system positioned to receive the beams from the aperture stop;
    a recording medium positioned to receive the beams from the scanning optical system; and
    a filter positioned where the multiple beams are coincident with each other, wherein each of the multiple beams are filtered by the filter.

2. The system according to claim 1, wherein the multiple beams are coincident with each other at coincident Fourier planes.

3. The system according to claim 1, wherein the filter is an optical filter.

4. The system according to claim 1, wherein the filter is an amplitude filter.

5. The system according to claim 1, wherein the filter is a phase filter.

6. The system according to claim 1, wherein the filter is configured to filter magnification errors.

7. The system according to claim 1, wherein the filter is configured to filter rotation errors.

8. The system according to claim 7, wherein the rotation errors cause a gap in the image.

9. The system according to claim 7, wherein the rotation errors cause an overlap in the image.

10. The system according to claim 1, wherein the multiple-beam generator is a two dimensional multiple-beam array.

11. The system of claim 1, wherein said filter has a plurality of semi or fully opaque bars aligned in a parallel direction to a slow scan.

12. The system of claim 1, wherein the filter is configured with absorbing bars spaced on centers that equate to 2× the frequency to be suppressed, with a first bar centered in a position that equates to zero frequency.

13. A method for reducing imaging errors of a printing system comprising:
    generating multiple beams with a multiple-beam generator array;
    receiving the multiple beams by a collimator lens;
    positioning an aperture stop at a location where the multiple beams are each co-incident with each other;
    receiving the beams from the aperture stop by a scanning optical system;
    receiving the beams from the scanning optical system by a recording medium; and
    filtering each of the multiple beams by a filter positioned at a location where the multiple beams are coincident with each other.

14. The method according to claim 13, wherein the multiple beams are coincident with each other at coincident Fourier planes.

15. The method according to claim 13, wherein the filter is an optical filter.

16. The method according to claim 13, wherein the filter is configured to filter magnification errors.

17. The method according to claim 13, wherein the filter is configured to filter rotation errors.

18. The method according to claim 13, wherein the multiple-beam generator is a two dimensional multiple-beam array.

19. The method of claim 13, wherein the filter is configured with absorbing bars spaced on centers that equate to 2× the frequency to be suppressed, with a first bar centered in a position that equates to zero frequency.

20. A printing system comprising:
    a multiple-beam generator array configured to generate multiple beams;
    a collimator lens positioned to receive the multiple beams;
    an aperture stop positioned at a location where the multiple beams are each coincident with each other;
    a scanning optical system positioned to receive the beams from the aperture stop;
    a recording medium positioned to receive the beams from the scanning optical system; and
    a filter positioned where the multiple beams are coincident with each other, wherein each of the multiple beams are filtered by the filter and the filter is one of an optical filter, an amplitude filter, a phase filter, a magnification error filter or a rotation error filter.

* * * * *